May 5, 1970 — L. ZETTERVALL — 3,510,397
SPACER FOR THE FUEL RODS OF THE FUEL ELEMENT OF A NUCLEAR REACTOR
Filed Aug. 15, 1967 — 3 Sheets-Sheet 1

INVENTOR
Leif Zettervall,
BY Pierce, Scheffler & Parker
his ATTORNEY

United States Patent Office 3,510,397
Patented May 5, 1970

3,510,397
SPACER FOR THE FUEL RODS OF THE FUEL
ELEMENT OF A NUCLEAR REACTOR
Leif Zettervall, Handen, Sweden, assignor to Aktiebolaget
Atomenergi, Stockholm, Sweden, a company of Sweden
Filed Aug. 15, 1967, Ser. No. 660,786
Claims priority, application Sweden, Aug. 15, 1966,
11,052/66
Int. Cl. G21c 3/34, 3/30, 3/32
U.S. Cl. 176—78                                    3 Claims

ABSTRACT OF THE DISCLOSURE

A useful spacer for holding the fuel rods of a nuclear reactor in their desired positions consists of a plurality of annular members fastened to each other, each annular member containing two rigid supports for the fuel rods, said supports consisting of portions of the annular member having been bent inwardly and a resilient support for the fuel rods.

---

The invention is concerned with a spacer for the fuel rods of a fuel element of a nuclear reactor. The main object of the invention is to provide a spacer which contains a minimum quantity of construction material, and which holds the fuel rods fixed without any sideways vibrations.

It is another object of the invention to provide a spacer which holds the fuel rods fixed so as not to obstruct the emission of heat from the fuel rods, so as to cause only a minimum danger of corrosion at the points of contact, and so as not to obstruct the flow of the coolant.

The spacer of the invention is characterized in consisting of a plurality of annular members fastened to each other, each annular member containing two rigid supports for the fuel rods, said supports consisting of portions of the annular member having been bent inwardly, and a resilient support for the fuel rods.

The invention will now be described with reference to the accompanying drawings illustrating a plurality of embodiments designed for a water-cooled nuclear reactor, the cooling water being arranged to flow parallel with the fuel rods.

Figure 1:
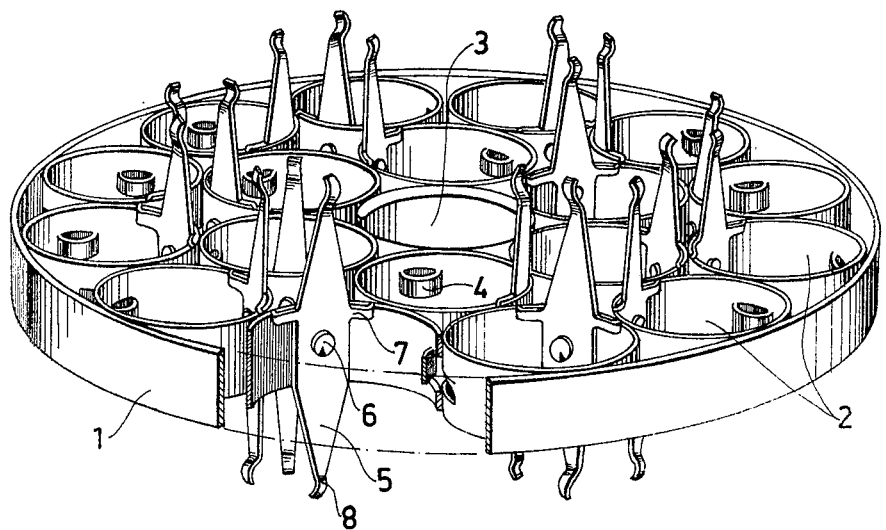
Figure 2:
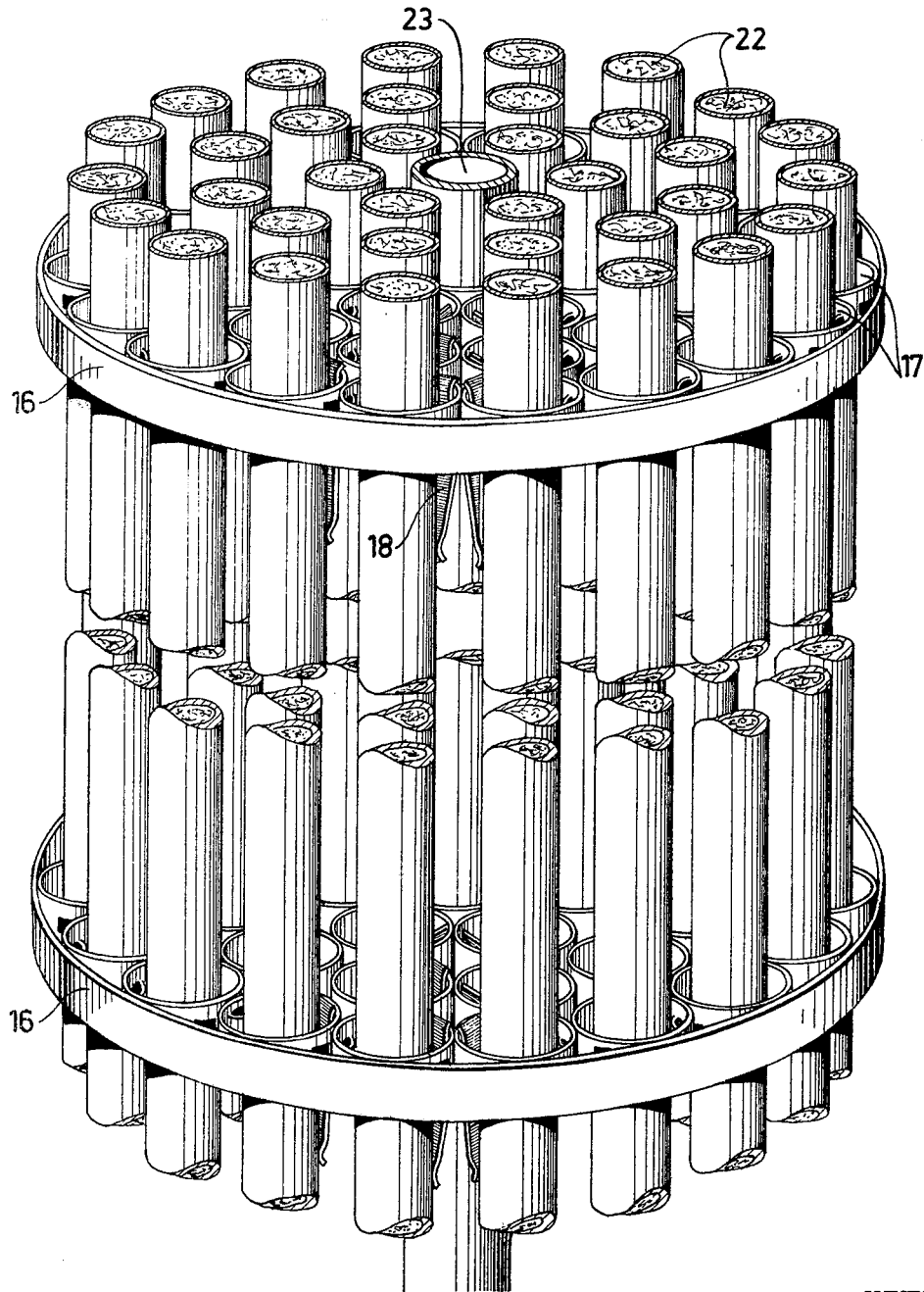
Figure 3:
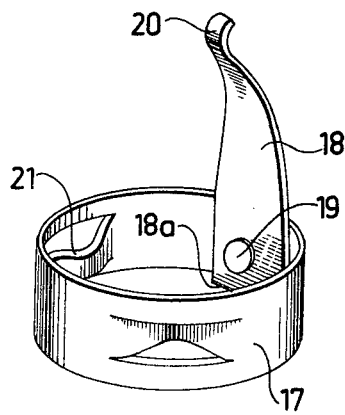
Figure 4:
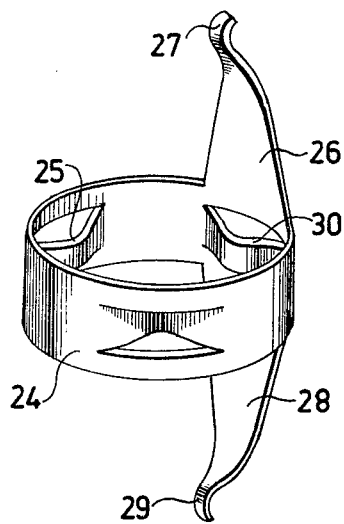

FIG. 1 illustrates a first embodiment. FIG. 2 illustrates a portion of a fuel element, containing spacers according to a third embodiment. FIG. 3 illustrates a part of the spacers shown in FIG. 2. FIG. 4 illustrates a part of a spacer according to a fourth embodiment.

The spacer of FIG. 1 consists of an outer ring 1, and in said ring eighteen annular members 2 and one central tubular member 3. All these parts 1–3 are welded to each other to form a rigid assembly. Each annular member 2 contains two rigid supports 4. Such a rigid support has been produced by providing two parallel slots in the wall of the annular member, and bending the wall portion between said slots towards the centre of the annular member. Each annular member 2 also contains one resilient support consisting of a spring member 5 fastened to the wall of the annular member by means of a rivet 6. The spring member 5 has two fingers 7 engaging the edge of annular member 2, thus ensuring a rigid connection between the spring member and the annular member. The spring member 5 has narrowing portions extending above and below the annular member 2. The ends 8 of said narrowing portions are rounded.

When a fuel element is being assembled the fuel rods are inserted into the annular members 2, the walls of a fuel rod being supported by the two rigid supports 4 and by the two rounded ends 8 of the spring member 5. A supporting rod or tube is inserted into the central tubular member 3. Two adjacent spacers are kept at the desired distance by means of spacing tubes surrounding said central supporting rod or tube. If, during operation, a straight fuel rod is subjected to bending, the spring member 5 will yield until the fuel rod comes into contact with the rivet 6. Any further bending of the fuel rod is now impossible.

FIG. 2 illustrates a portion of a fuel element containing thirty-six fuel rods 22. The figure shows two spacers, consisting of an outer ring 16, thirty-six annular members 17, and one central tubular member for a support rod or tube 23. The spacers are spaced apart at the desired distance by means of spacing tubes surrounding the central support rod. The annular members 17 contain two rigid supports 21 of the same type as disclosed with reference to FIG. 1. A spring member 18 is fastened to the annular member 17 by means of a rivet 19. One end 18a of the spring member is bent outward to engage the edge of the annular member 17, thus ensuring a firm connection between the annular member 17 and the spring member 18. The other end of the spring member narrows towards its extreme end 20, which is rounded. The fuel rod 22 is supported by the two rigid supports 21 and by the rounded end 20 of the resilient support 18.

FIG. 4 illustrates another embodiment of an annular member. This annular member 24 has two protruding springy portions 26, 28 narrowing towards their rounded extreme ends 27, 29 which are to engage a fuel rod. The annular member contains two rigid supports 25 of the type described earlier. The annular member 24 also contains a third rigid support 30 which is to come into contact with the fuel rod only if the fuel rod is bent to cause a yield of the spring members 26, 28.

The spacers of the invention should preferably consist of a material having a low absorption of neutrons, preferably zirconium. Another useful material for the spacer, or for the spring members only, is the nickel-chromium-iron alloy bearing the trade-name Inconel.

What is claimed is:
1. A spacer arrangement for a nuclear reactor fuel element comprising a plurality of fuel rods, said spacer arrangement consisting essentially of a rigid assembly of a plurality of annular members fastened to each other,
   each annular member being adapted to receive one fuel rod and comprising two rigid supports for a fuel rod, said two rigid supports consisting of spaced inwardly bent portions of the annular member;
   a resilient support for a fuel rod said resilient support being fixed to the wall of said annular member in spaced relation with respect to said two rigid supports and having at least one narrowing end portion extending axially beyond said annular member, the terminus of said narrowing end portion being rounded and adapted to bear against a fuel rod when such fuel rod is inserted in said annular member; and
   a third rigid support in fixed association with said resilient support and limiting outward movement of the latter.

2. A fuel element for a nuclear reactor, comprising a plurality of parallel fuel rods and at least one spacer arrangement as defined in claim 1.

3. A fuel element as claimed in claim 2, in which the spacer arrangement contains a central tubular member in which a support rod is mounted parallel with the fuel rods and extending through the central tubular members of a plurality of such spacer arrangements.

References Cited

UNITED STATES PATENTS

| 3,182,003 | 5/1965 | Thorp et al. | 176—78 |
| 3,228,854 | 1/1966 | Bekkering et al. | 176—78 |
| 3,255,090 | 6/1966 | Leirvik | 176—76 |
| 3,301,764 | 1/1967 | Timbs et al. | 176—76 X |
| 3,314,860 | 4/1967 | Wilman | 176—78 |

FOREIGN PATENTS

| 1,436,977 | 3/1966 | France. |
| 1,082,679 | 6/1960 | Germany. |
| 1,104,082 | 4/1961 | Germany. |
| 925,154 | 5/1963 | Great Britian. |

REUBEN EPSTEIN, Primary Examiner

M. J. SCOLNICK, Assistant Examiner

U.S. Cl. X.R.

176—76